(12) United States Patent
Chou et al.

(10) Patent No.: US 9,229,304 B2
(45) Date of Patent: Jan. 5, 2016

(54) PHOSPHOR DEVICE AND ILLUMINATION SYSTEM USING SAME

(71) Applicant: Delta Electronics, Inc., Taoyuan Hsien (TW)

(72) Inventors: Yen-I Chou, Taoyuan County (TW); Chi Chen, Taoyuan County (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

(21) Appl. No.: 13/966,505

(22) Filed: Aug. 14, 2013

(65) Prior Publication Data

US 2014/0293576 A1    Oct. 2, 2014

(30) Foreign Application Priority Data

Apr. 2, 2013  (TW) .............................. 102111919 A

(51) Int. Cl.
  *G03B 21/20* (2006.01)
  *G03B 33/08* (2006.01)
(52) U.S. Cl.
  CPC .............. *G03B 21/204* (2013.01); *G03B 33/08* (2013.01)
(58) Field of Classification Search
  CPC ................................. H01L 33/50; H01L 33/58
  USPC .............................. 313/498–501; 362/35, 231
  See application file for complete search history.

(56) References Cited

U.S. PATENT DOCUMENTS

| 2007/0019408 A1* | 1/2007 | McGuire et al. ............... 362/231 |
| 2009/0187234 A1* | 7/2009 | Meyer et al. ..................... 607/88 |
| 2012/0133903 A1 | 5/2012 | Tanaka |

FOREIGN PATENT DOCUMENTS

| CN | 102722072 | 10/2012 |
| JP | 2011243840 | 12/2011 |
| JP | 2013057850 | 3/2013 |
| WO | 2012109168 | 8/2012 |

* cited by examiner

*Primary Examiner* — Anne Hines
(74) *Attorney, Agent, or Firm* — Kirton McConkie; Evan R. Witt

(57) ABSTRACT

A phosphor device of an illumination system emitting a first color light in a first waveband region includes a first region having n sub-regions and n single-powder phosphor agents, wherein n is ≥2. The n single-powder phosphor agents are coated on the n sub-regions, respectively, for transforming the first color light in the first waveband region into n color lights in n waveband regions. The n sub-regions are arranged in a specific area ratio. The first color light in the first waveband region is cyclically transformed into a second color light in a second waveband region, a third color light in a third waveband region, . . . , and a $(n+1)^{th}$ color light in a $(n+1)^{th}$ waveband region in a specific time ratio according to the specific area ratio, such that the n color lights sequentially outputted in the specific time ratio are integrated as a specific color light.

7 Claims, 6 Drawing Sheets

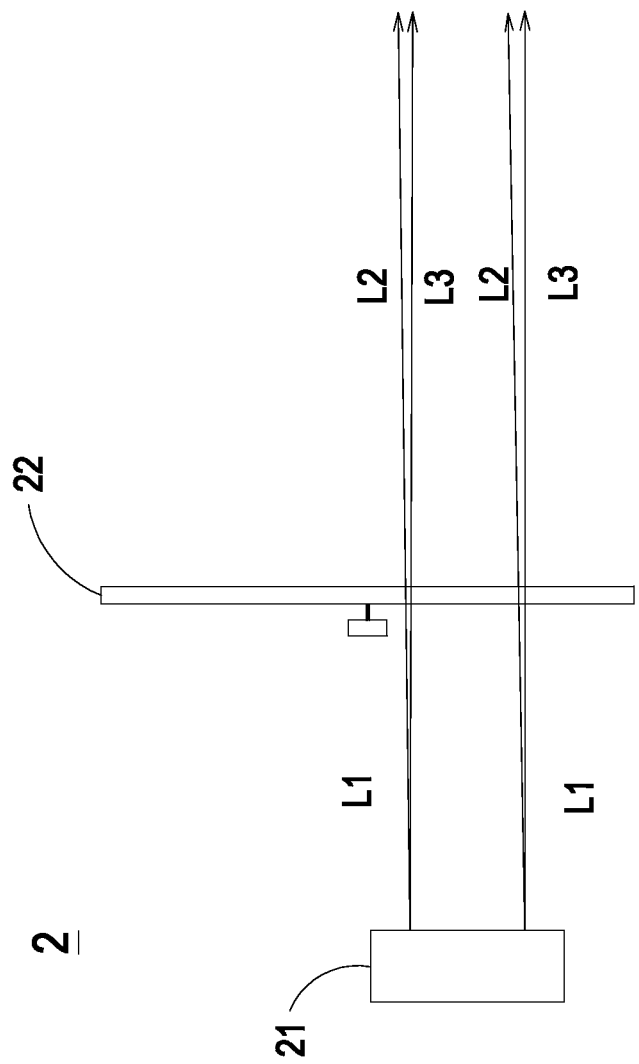

PHOSPHOR DEVICE AND ILLUMINATION SYSTEM USING SAME

FIELD OF THE INVENTION

The present invention relates to a phosphor device, and more particularly to a phosphor device with plural sub-regions for increasing the output efficiency and the light color diversity and an illumination system using the same.

BACKGROUND OF THE INVENTION

In recent years, lot types of projection device such as projectors are widely used in families, schools and business occasions in order to amplify and display an image signal provided by an image source on a screen. For the purpose of reducing the power consumption and the product size, a solid-state light-emitting element (e.g. a LED or a laser element) is employed in the illumination system of current projector to replace the conventional high intensity discharge (HID) lamp.

In general, the illumination system of the projector should emit three primary color lights, i.e. red light (R), green light (G) and blue light (B). As for the luminous efficiency of the solid-state light-emitting element, the blue solid-state light-emitting element has higher luminous efficiency than the red solid-state light-emitting element or the green solid-state light-emitting element does. Since the blue solid-state light-emitting element has better luminous efficiency, the red light and the green light are produced by using a blue solid-state light-emitting element and a wavelength-transforming device (e.g. a phosphor wheel or a phosphor plate) to excite blue light as red light or green light. That is, without the red solid-state light-emitting element and the green solid-state light-emitting element, the uses of the blue solid-state light-emitting element and the device containing phosphor coating can directly emit the red light or the green light. Consequently, the luminous efficiency of the whole illumination system is enhanced.

For example, one of the illumination systems of the conventional projection device utilizes plural blue solid-state light-emitting elements and plural phosphor wheels having a single region, and the other one of the illumination systems of the conventional projection device utilizes a single solid-state light-emitting element and a single phosphor wheel having plural regions. Please refer to FIG. 1A and FIG. 1B. FIG. 1A schematically illustrates the structure of a conventional phosphor wheel having a single region. FIG. 1B schematically illustrates the structure of a conventional phosphor wheel having plural regions. As shown in FIG. 1A, a conventional phosphor wheel 10 has a single region 101. A type of phosphor agent is coated on the single region 101 (i.e. the whole circle of phosphor wheel 10), wherein this phosphor agent is composed of plural kinds of phosphor powders and called mixture-powders phosphor agent. As shown in FIG. 1B, another conventional phosphor wheel 11 includes plural regions, and the number of the regions is 3 or 4 in general. An example of the conventional phosphor wheel 11 includes a first region 111, a second region 112, a third region 113 and a fourth region 114. A red type of phosphor agent, a green type of phosphor agent, a blue type of phosphor agent and a yellow type of phosphor agent are respectively coated on the first region 111, the second region 112, the third region 113 and the fourth region 114, wherein each type of phosphor agents is composed of plural kinds of phosphor powders and called mixture-powders phosphor agent.

To increase the light color diversity of the phosphor wheel, a phosphor agent is usually composed of two or more phosphor powders for adjusting the characteristics of the output light. For example, a red phosphor powder is usually added for the purpose of outputting warmer color lights, or a high-luminance phosphor powder having a main output wavelength of 555 nanometers is usually added for the purpose of increasing the luminance value of the output light. Nevertheless, different kinds of the phosphor powders may be fabricated by different companies, so it is not easy to know the exact composition of each phosphor powder. Under this circumstance, it is relatively difficult to mix the phosphor powders for obtaining the target phosphor agent. Also, a cascade effect occurs because of the different materials of the different phosphor powders. That is, a high energy level of one kind of phosphor powder is absorbed by the phosphor powder having a low energy level (i.e. long-wavelength phosphor material), so that the total output efficiency is decreased.

A common cascade effect occurs when mixing a yellow phosphor powder and a red phosphor powder. Because the part of output yellow light, which has a wavelength range from 510 nanometers to 580 nanometers, is absorbed by the red phosphor powder, the area of the spectrum of total output light (i.e. the output energy) is lower than the theoretical value of mixing the yellow phosphor powder and the red phosphor powder by 14%. As a result, not only the theoretical value cannot be achieved by the conventional powder-mixing method of prior art, but also the color saturation and hue cannot be matched with the industry standard value, such as the standard value of Rec. 709 (or called ITU-R Recommendation BT. 709) gamut of High Definition Television (HDTV), due to the cascade effect.

There is a need of providing a phosphor device and an illumination system using the same to obviate the drawbacks encountered from the prior art.

SUMMARY OF THE INVENTION

One embodiment of the present invention provides a phosphor device and an illumination system using the same in order to eliminate the drawbacks of the high fabricating difficulty of mixing phosphor powders and the low output efficiency, low color saturation and the color shift phenomena caused by the cascade effect.

The present invention also provides a phosphor device and an illumination system using the same. According one embodiment disclosed thereinafter, by including two or more sub-regions in each region, the cascade effect is avoided, the output efficiency and the light color diversity of transformation are increased, and the color saturation and the brightness of the output lights are enhanced.

The present invention further provides a phosphor device and an illumination system using the same. According one embodiment disclosed thereinafter, since two or more single-powder phosphor agents are respectively coated on different sub-regions, the mixing factors of phosphor powders are ignored, the manufacturing processes are simplified, and the fabricating cost and difficulty are reduced.

In accordance with an aspect of the present invention, there is provided a phosphor device of an illumination system emitting a first color light in a first waveband region. The phosphor device includes a first region and n single-powder phosphor agents. The first region includes n sub-regions, wherein n is an integer greater than or equal to 2. The n single-powder phosphor agents are coated on the n sub-regions, respectively, for transforming the first color light in the first waveband region into n color lights in n waveband regions. The n color lights in the n waveband regions include a second color light in a second waveband region, a third color light in a third waveband region, ..., and a $(n+1)^{th}$ color light in a $(n+1)^{th}$ waveband region. The n sub-regions are arranged in a specific area ratio. The first color light in the first waveband region is cyclically transformed into the second color light in the second waveband region, the third color light in the third waveband region, ..., and the $(n+1)^{th}$ color light in the $(n+1)^{th}$ waveband region in a specific time ratio according to the specific area ratio, so that the n color lights sequentially outputted in the specific time ratio are integrated as a specific color light.

In accordance with another aspect of the present invention, there is provided an illumination system. The illumination system includes a solid-state light-emitting element and a phosphor device. A first color light in a first waveband region is emitted to an optical path by the solid-state light-emitting element. The phosphor device is disposed on the optical path. The phosphor device includes a first region and n single-powder phosphor agents. The first region includes n sub-regions, among which n is an integer greater than or equal to 2. The n single-powder phosphor agents are coated on the n sub-regions, respectively, for transforming the first color light in the first waveband region into n color lights in n waveband regions. The n color lights in the n waveband regions include a second color light in a second waveband region, a third color light in a third waveband region, ..., and a $(n+1)^{th}$ color light in a $(n+1)^{th}$ waveband region. The n sub-regions are arranged in a specific area ratio. The first color light in the first waveband region is cyclically transformed into the second color light in the second waveband region, the third color light in the third waveband region, ..., and the $(n+1)^{th}$ color light in the $(n+1)^{th}$ waveband region in a specific time ratio according to the specific area ratio, so that the n color lights sequentially outputted in the specific time ratio are integrated as a specific color light.

The above contents of the present invention will become more readily apparent to those ordinarily skilled in the art after reviewing the following detailed description and accompanying drawings, in which:

BRIEF DESCRIPTION OF THE DRAWINGS

FIG. 2 schematically illustrates the configuration of an illumination system according to an embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
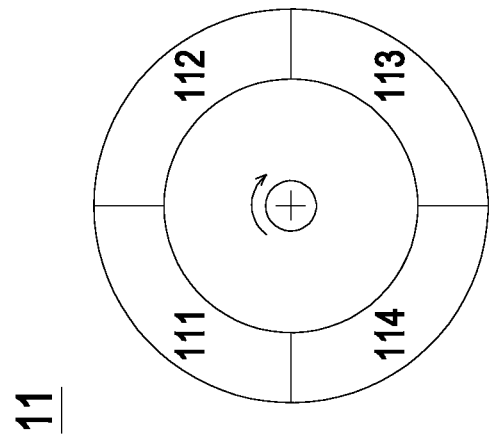
FIG. 1B schematically illustrates the structure of a conventional phosphor wheel having plural regions.
Figure 1A:
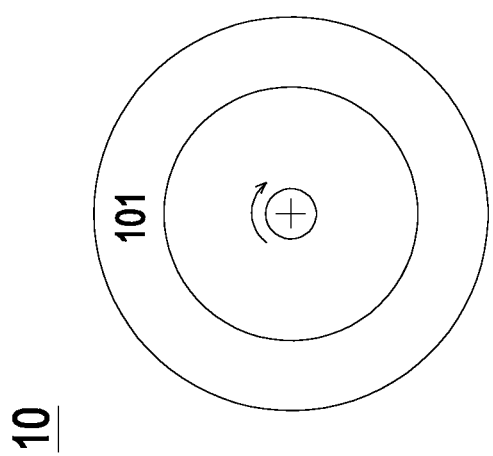
FIG. 1A schematically illustrates the structure of a conventional phosphor wheel having a single region.
Figure 3B:
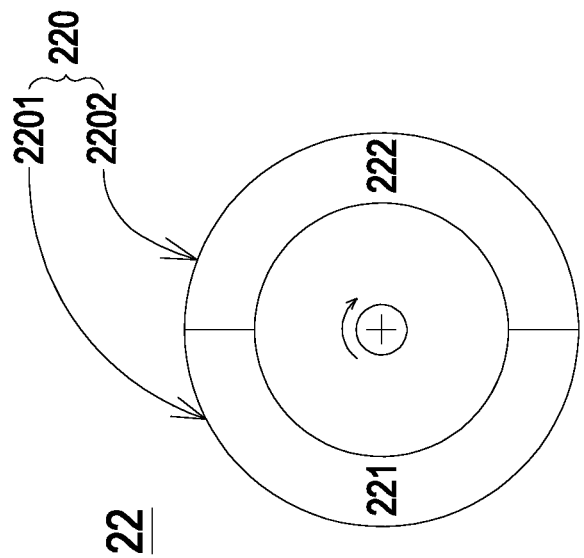
FIG. 3B schematically illustrates the structure of a phosphor device according to another embodiment of the present invention.
Figure 3A:
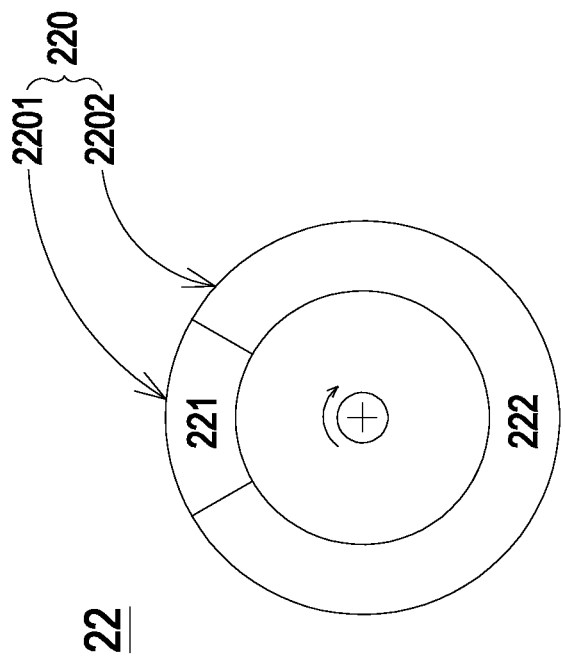
FIG. 3A schematically illustrates the structure of a phosphor device according to an embodiment of the present invention.

Please refer to FIG. 2, FIG. 3A and FIG. 3B. FIG. 2 schematically illustrates the configuration of an illumination system according to an embodiment of the present invention. FIG. 3A schematically illustrates the structure of a phosphor device according to an embodiment of the present invention. FIG. 3B schematically illustrates the structure of a phosphor device according to another embodiment of the present invention. As shown in FIG. 2, FIG. 3A and FIG. 3B, the illumination system 2 of one embodiment of the present invention is applied to projection apparatus like laser projectors, 3D-image projectors and real object projectors. The illumination system 2 includes a solid-state light-emitting element 21 and a phosphor device 22. The solid-state light-emitting element 21 is not limited to a laser source or a light emitting diode, and is preferably a blue light laser source or a blue light emitting diode. A first color light L1 in a first waveband region is emitted along an optical path by the solid-state light-emitting element 21, and the phosphor device 22 is disposed on the optical path. The phosphor device 22 includes a first region 220 and n single-powder phosphor agents, wherein the first region 220 includes n sub-regions and n is an integer greater than or equal to 2. The n single-powder phosphor agents are coated on the n sub-regions, respectively, for transforming the first color light L1 in the first waveband region into n color lights in n waveband regions. The n color lights in the n waveband regions include a second color light in a second waveband region, a third color light in a third waveband region, ..., and a $(n+1)^{th}$ color light in a $(n+1)^{th}$ waveband region.

For example, when n is equal to 2, the n single-powder phosphor agents are a first single-powder phosphor agent 221 and a second single-powder phosphor agent 222, and the n sub-regions of the first region 220 include a first sub-region 2201 and a second sub-region 2202. The first single-powder phosphor agent 221 is coated on the first sub-region 2201 for transforming the first color light L1 in the first waveband region into a second color light L2 in a second waveband region. The second single-powder phosphor agent 222 is coated on the second sub-region 2202 for transforming the first color light L1 in the first waveband region into a third color light L3 in a third waveband region.

In some embodiments, the n sub-regions are arranged in a specific area ratio, and each of n sub-regions is a single block. The first color light L1 in the first waveband region is cyclically transformed into the second color light L2 in the second waveband region, the third color light L3 in the third waveband region, ..., and the $(n+1)^{th}$ color light in the $(n+1)^{th}$ waveband region in a specific time ratio according to the specific area ratio, so that the n color lights sequentially outputted in the specific time ratio are integrated as a specific color light.

Again, when n is equal to 2, the first color light L1 in the first waveband region is cyclically transformed into the second color light L2 in the second waveband region and the third color light L3 in the third waveband region in a specific time ratio, and the second color light L2 and the third color light L3 sequentially outputted in the specific time ratio are integrated as a specific color light, which is red light, yellow light or red-yellow light but not limited thereto. Since two or more single-powder phosphor agents are respectively coated on different sub-regions, the mixing factors of phosphor powders are ignored, the manufacturing processes are simplified, and the fabricating cost and difficulty are reduced.

In some embodiments, the specific area ratio of the first sub-region 2201 to the second sub-region 2202 of the first region 220 of the phosphor device 22 can be adjusted for meeting the practical demands or requirements. For example, the specific area ratio of the first sub-region 2201 to the second sub-region 2202 is 1 to 5. As shown in FIG. 3A, when the phosphor device 22 is a circle-shaped phosphor wheel, the central angle corresponding to the first sub-region 2201 is 60 degrees, and the central angle corresponding to the second sub-region 2202 is 300 degrees. The specific area ratio of the first sub-region 2201 to the second sub-region 2202 can also be 1/1. As shown in FIG. 3B, the central angles corresponding to the first sub-region 2201 and the second sub-region 2202 are respectively 180 degrees. Furthermore, the specific area ratio can be adjusted to another area ratio or angle ratio for meeting any design demands.

Please refer to FIG. 3A again. Instead of the single region coated with mixture-powders phosphor agent of the conventional phosphor device, the first region 220 of the phosphor device 22 of one embodiment of the present invention includes two or more sub-regions, each of which is coated with one single-powder phosphor agents thereon, and the sub-regions have different single-powder phosphor agents. For example, the first region 220 can be designed as a red-yellow light-exciting region, so that a red-yellow light is excited and outputted by the phosphor device 22 of the present invention. The first single-powder phosphor agent 221 coated on the first sub-region 2201 is a red single-powder phosphor agent of 50 weight percent (wt %), and the second single-powder phosphor agent 222 coated on the second sub-region 2202 is a yellow single-powder phosphor agent of 50 weight percent herein. Under this circumstance, the specific area ratio is adjusted for generating the red-yellow light required. To increase the luminance, the ratio of the first sub-region 2201 to the second sub-region 2202 is preferably 1/5. That is, the weight ratio of red single-powder phosphor agent to yellow single-powder phosphor agent is 1/5, the specific time ratio of constant speed rotation of the phosphor device 22 is also 1/5, and the luminance of the output light is 176.37 lumens per watt (lm/W). Compared with the red light outputted by the conventional phosphor device of 140.57 lm/W, the increasing percentage is 25%.

In brief, the mixture-powders phosphor agent of 50 weight percent is coated on the single region of the conventional phosphor agent, and the mixture-powders phosphor agent is combined with a yellow single-powder phosphor agent of 41.67 weight percent and a red single-powder phosphor agent of 8.33 weight percent. Because the weight percentage of the red single-powder phosphor agent is only 8.33 wt % and the weight percentage of the yellow single-powder phosphor agent is only 41.67 wt %, the luminous efficiency of the conventional phosphor device is far less than luminous efficiency of the phosphor device of the present invention. In addition, since none of any mixture-powders phosphor agent is coated on the first region 220 of the phosphor device 22 of one embodiment of the present invention, the cascade effect is avoided, the output efficiency and the light color diversity of transformation are increased, and the color saturation and the brightness of the output lights are enhanced by including two or more sub-regions in each region of the phosphor device 22.

Figure 4:
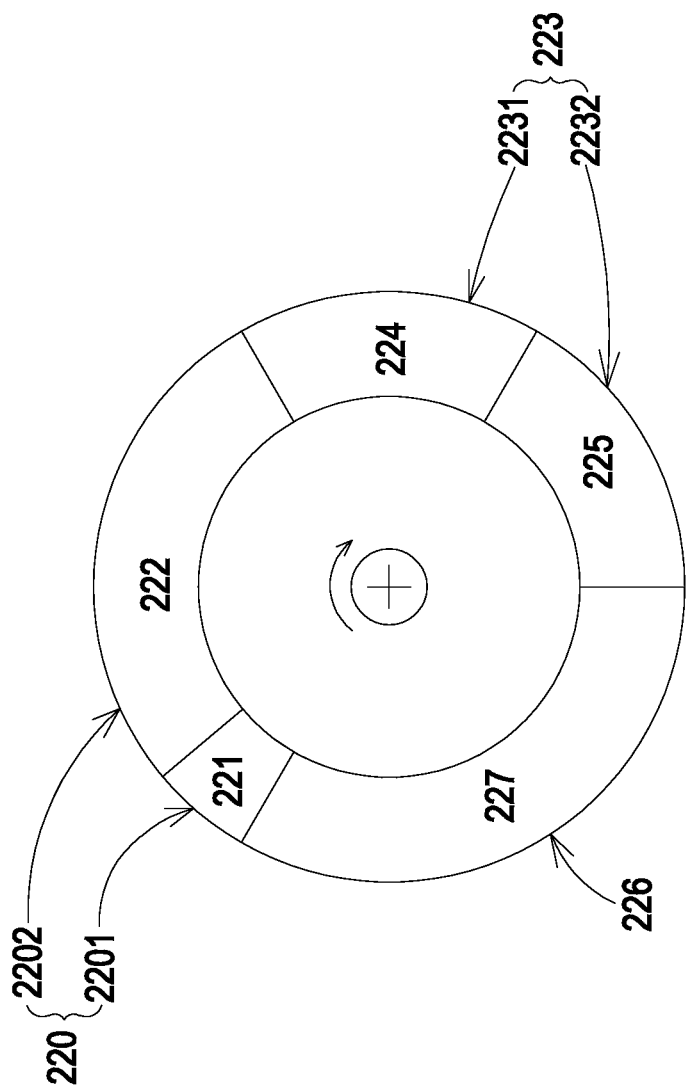
FIG. 4 schematically illustrates the structure of a phosphor device according to still another embodiment of the present invention.

Please refer to FIG. 4. FIG. 4 schematically illustrates the structure of a phosphor device according to still another embodiment of the present invention. The phosphor device 22 may further includes a second region 223, a third single-powder phosphor agent 224 and a fourth single-powder phosphor agent 225, wherein the second region 223 includes a third sub-region 2231 and a fourth sub-region 2232. The third single-powder phosphor agent 224 is coated on the third sub-region 2231 for transforming the first color light L1 in the first waveband region into a fourth color light in a fourth waveband region, and the fourth single-powder phosphor agent 225 is coated on the fourth sub-region 2232 for transforming the first color light L1 in the first waveband region into a fifth color light in a fifth waveband region, but not limited thereto. The concept and the principle of transforming the first color light L1 into the fourth color light and the fifth color light are similar with those of transforming the first color light L1 into the second color light L2 and the third color light L3 mentioned above (as shown in FIG. 2), so there are no more detailed descriptions and illustrations herein for conciseness.

Moreover, the phosphor device 22 further includes a third region 226 for sequentially outputting lots kinds of color lights with the first region 220 and the second region 223. An example of the color lights sequentially outputted by the first region 220, the second region 223 and the third region 226 includes but not limited to the three primary color lights, i.e. blue light, green light and red light. The third region 226 includes a transparent material 227, which is for example a glass or an acryl. The blue light is directly transmitted through the transparent material 227 of the third region 226, the red light is excited and outputted by the first region 220, and the green light is excited and outputted by the second region 223.

In some embodiments, when the phosphor device 22 of the present invention is utilized for sequentially outputting three primary color lights, the area ratio of the first region 220 to the second region 223 to the third region 226 is 1:1:1. The central angles corresponding to the first region 220, the second region 223 and the third region 226 of a circle-shaped phosphor wheel are 120 degrees. The specific area ratio of the first sub-region 2201 to the second sub-region 2202 is 1/5, and the central angles corresponding to the first sub-region 2201 and the second sub-region 2202 of the circle-shaped phosphor wheel are respectively 20 degrees and 100 degrees. The area ratio of the third sub-region 2231 to the fourth sub-region 2232 is 1/1, and the central angles corresponding to the third sub-region 2231 and the fourth sub-region 2232 of the circle-shaped phosphor wheel are 60 degrees. As a result, the red light, the green light and the blue light, which are the three primary color lights, are respectively outputted by the first region 220, the second region 223 and the third region 226 of the phosphor device 22. Certainly, another ratio or corresponding central angle may be adjusted, arranged and designed for meeting the demands and requirements.

Figure 5:
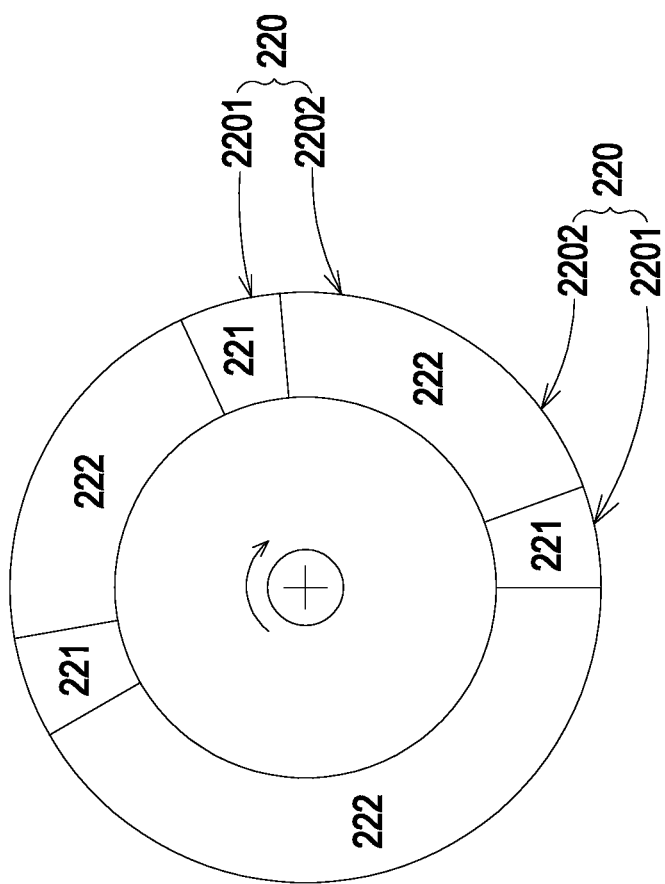
FIG. 5 schematically illustrates the structure of a phosphor device according to other embodiment of the present invention.

Please refer to FIG. 5. FIG. 5 schematically illustrates the structure of a phosphor device according to other embodiment of the present invention. As shown in FIG. 5, the first sub-region 2201 and the second sub-region 2202 of the first region 220 may be freely divided and arranged in the first region 220. The specific area ratio, however, of the total first sub-region 2201 to the total second sub-region 2202 may not be changed compared with the above mentioned embodiment, and the preferable specific area ratio may be 1/5. Furthermore, the first sub-region 2201 and the second sub-region 2202 can be divided into a plurality of unequal blocks. In other words, the first sub-region 2201 and the second sub-region 2202 are composed of a plurality of unequal blocks. The output efficiencies of different implements are the same if the total specific area ratios are the same. For example, the first sub-region 2201 can be divided into three blocks respectively having central angles corresponding to the circle-shaped phosphor wheel of 30 degrees, and the second sub-region 2202 can be divided into three blocks respectively having central angles corresponding to the circle-shaped phosphor wheel of 75, 75 and 150 degrees. The output efficiency herein is same as the output efficiency of the previous embodiment, and the principle is similar with the previous embodiment.

Figure 6B:
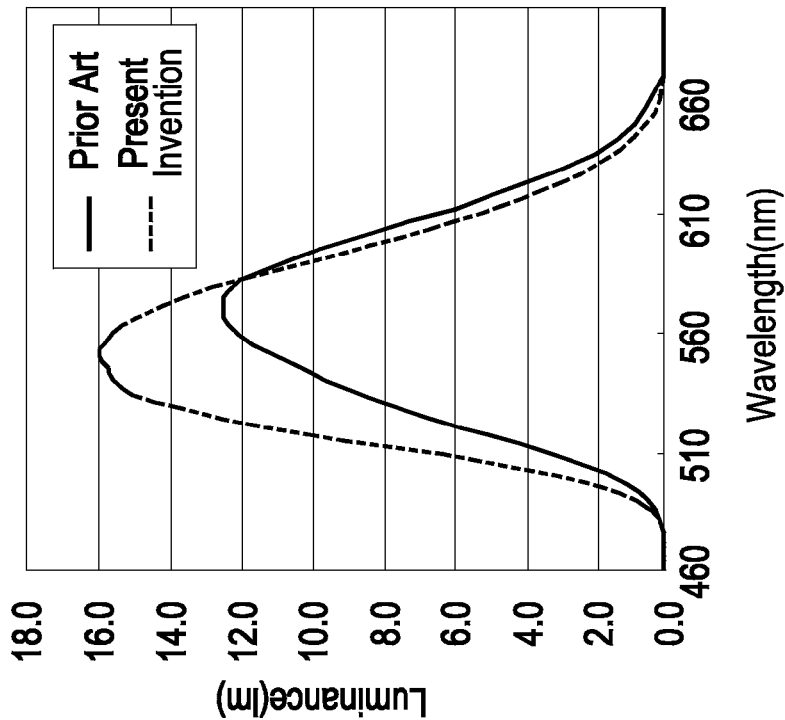
FIG. 6B schematically illustrates a corresponding graph of the luminance versus the wavelength of a specific color light outputted by the phosphor device according to an embodiment of the present invention and a color light outputted by the conventional phosphor wheel of the prior art.
Figure 6A:
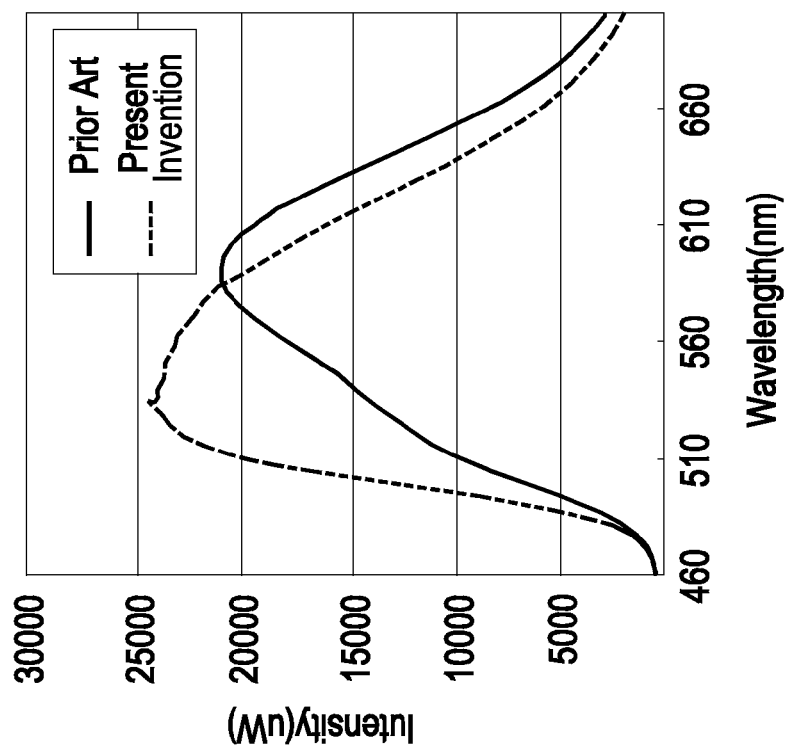
FIG. 6A schematically illustrates a corresponding graph of the intensity versus the wavelength of a specific color light outputted by the phosphor device according to an embodiment of the present invention and a color light outputted by the conventional phosphor wheel of the prior art.

Please refer to FIG. 6A and FIG. 6B. FIG. 6A schematically illustrates a corresponding graph of the intensity versus the wavelength of a specific color light outputted by the phosphor device according to an embodiment of the present invention and a color light outputted by the conventional phosphor wheel of the prior art. FIG. 6B schematically illustrates a corresponding graph of the luminance versus the wavelength of a specific color light outputted by the phosphor device according to an embodiment of the present invention and a color light outputted by the conventional phosphor wheel of the prior art. As shown in FIG. 6A and FIG. 6B, the luminance and the color coordinate of the output color light excited by 8 watts blue light laser through the conventional powder-mixing method are 140.57 lm/W and (0.474, 0.497). On the other hand, the luminance of the specific color light outputted by the phosphor device of the invention and excited by 8 watts blue light laser is 176.37 lm/W. Not only the output efficiency is enhanced by 25 percent, but also the practical luminance value is matched with the theoretical luminance value directly summed of the yellow single-powder phosphor agent and the red single-powder phosphor agent, which is 177.4 lm/W (as shown in Table 1). It is no doubt that the present invention achieves the advantages of avoiding the cascade effect, enhancing the output efficiency, increasing the output spectrum of red light, and enhancing the diversity of color gamut.

TABLE 1

|  | lumen/Watt | Color Coordinate (x, y) |
| --- | --- | --- |
| Conventional powder-mixing method | 140.57 | (0.474, 0.497) |
| Practical value of present invention | 176.37 | (0.412, 0.546) |
| Theoretical value of present invention | 177.40 | (0.408, 0.547) |
| Yellow single-powder phosphor agent | 198.97 | (0.386, 0.565) |
| Red single-powder phosphor agent | 69.52 | (0.615, 0.379) |

From the above description, the present invention provides a phosphor device and an illumination system using the same. By including two or more sub-regions in each region, the cascade effect is avoided, the output efficiency and the light color diversity of transformation are increased, and the color saturation and the brightness of the output lights are enhanced. Meanwhile, since two or more single-powder phosphor agents are respectively coated on different sub-regions, the mixing factors of phosphor powders are ignored, the manufacturing processes are simplified, and the fabricating cost and difficulty are reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor device of an illumination system comprising a solid-state light-emitting element emitting a first color light in a first waveband region, comprising:
    a single region including n sub-regions, wherein n is an integer greater than or equal to 2; and
    n single-powder phosphor agents, comprising at least one red single-powder phosphor agent and at least one yellow single-powder phosphor agent, coated on said n sub-regions, respectively, for transforming said first color light in said first waveband region into n color lights in n different waveband regions, respectively, wherein said n color lights in said n waveband regions include a second color light in a second waveband region, a third color light in a third waveband region, . . . , and a $(n+1)^{th}$ color light in a $(n+1)^{th}$ waveband region, wherein said n sub-regions are arranged in a specific area ratio, and said second color light, said third color light, . . . , and said $(n+1)^{th}$ color light are integrated as a red light, a yellow light or a red-yellow light according to said specific area ratio.

2. The phosphor device according to claim 1, wherein said n sub-regions are a first sub-region and a second sub-region and said n single-powder phosphor agents are a first single-powder phosphor agent and a second single-powder phosphor agent, wherein said first single-powder phosphor agent is coated on said first sub-region for transforming said first color light in said first waveband region into said second color light in said second waveband region, wherein said second single-powder phosphor agent is coated on said second sub-region for transforming said first color light in said first waveband region into said third color light in said third waveband region, and wherein said first color light in said first waveband region is cyclically transformed into said second color light in said second waveband region and said third color light in said third waveband region according to said specific time ratio, such that said second color light and said third color light sequentially outputted in said specific time ratio are integrated as said red light, a yellow light or a red-yellow light.

3. The phosphor device according to claim 2, wherein said first color light in said first waveband region is blue light, said second color light in said second waveband region is red light, and said third color light in said third waveband region is yellow light.

4. The phosphor device according to claim 3, wherein said first color light in said first waveband region is provided by a laser source.

5. The phosphor device according to claim 3, wherein said specific area ratio of said first sub-region to said second sub-region is 1 to 5.

6. The phosphor device according to claim 1, wherein said n sub-regions are adjacent to each other.

7. An illumination system, comprising:
    a solid-state light-emitting element for emitting a first color light in a first waveband region along an optical path; and
    a phosphor device disposed on said optical path, comprising:
    a single region including n sub-regions, wherein n is an integer greater than or equal to 2; and
    n single-powder phosphor agents, comprising at least one red single-powder phosphor agent and at least one yellow single-powder phosphor agent, coated on said n sub-regions, respectively, for transforming said first color light in said first waveband region into n color lights in n different waveband regions, respectively, wherein said n color lights in said n waveband regions include a second color light in a second waveband region, a third color light in a third waveband region, ..., and a $(n+1)^{th}$ color light in a $(n+1)^{th}$ waveband region, wherein said n sub-regions are arranged in a specific area ratio, and said second color light, said third color light, ..., and said $(n+1)^{th}$ color light are integrated as a red light, a yellow light or a red-yellow light according to said specific area ratio.

* * * * *